(12) United States Patent
Xu et al.

(10) Patent No.: US 6,908,603 B2
(45) Date of Patent: Jun. 21, 2005

(54) IN-SITU ZSM-5 SYNTHESIS

(75) Inventors: Mingting Xu, Edison, NJ (US); John Macaoay, Linden, NJ (US)

(73) Assignee: Engelhard Corporation, Iselin, NJ (US)

( * ) Notice: Subject to any disclaimer, the term of this patent is extended or adjusted under 35 U.S.C. 154(b) by 213 days.

(21) Appl. No.: 10/452,257

(22) Filed: Jun. 2, 2003

(65) Prior Publication Data

US 2004/0238407 A1 Dec. 2, 2004

(51) Int. Cl.$^7$ ................................ C01B 39/38
(52) U.S. Cl. .................. 423/709; 423/712; 423/716; 423/DIG. 22; 208/120.01
(58) Field of Search .................. 423/709, DIG. 22, 423/712, 716; 208/120.01

(56) References Cited

U.S. PATENT DOCUMENTS

| | | |
|---|---|---|
| 4,091,007 A | 5/1978 | Dwyer et al. |
| 4,493,902 A | 1/1985 | Brown et al. |
| 4,522,705 A | 6/1985 | Chu et al. |
| 4,631,262 A | 12/1986 | Altomare |
| 4,650,655 A | 3/1987 | Chu et al. |
| 5,145,659 A | 9/1992 | McWilliams |
| 5,232,675 A | 8/1993 | Shu et al. |
| 5,558,851 A | 9/1996 | Miller |
| 5,951,963 A | 9/1999 | He et al. |
| 6,004,527 A | 12/1999 | Murrell et al. |
| 6,261,534 B1 | 7/2001 | Miller |
| 6,667,023 B2 * | 12/2003 | Ludvig ..................... 423/709 |
| 2004/0091420 A1 * | 5/2004 | Rao ........................... 423/709 |
| 2004/0092396 A1 * | 5/2004 | Glazer et al. .............. 502/439 |

FOREIGN PATENT DOCUMENTS

| | | |
|---|---|---|
| CN | 1057067 C | 10/2000 |
| EP | 0068817 | 6/1982 |
| EP | 0156595 | 3/1985 |

* cited by examiner

*Primary Examiner*—David Sample
(74) *Attorney, Agent, or Firm*—Raymond F. Keller

(57) ABSTRACT

A novel method of forming ZSM-5 comprises reacting calcined kaolin microspheres with silicate and a seed solution used for forming zeolite Y under conditions of pH, temperature, and time to yield ZSM-5 crystals formed in-situ on said calcined kaolin microspheres. The reaction medium does not contain any organic templates or ZSM-5 seeding crystals.

24 Claims, 1 Drawing Sheet

IN-SITU ZSM-5 SYNTHESIS

FIELD OF THE INVENTION

The present invention relates to the production of crystalline aluminosilicate ZSM-5, and more specifically, to improved methods for rapidly and efficiently producing in-situ ZSM-5 crystals from preformed kaolin microspheres and without organic templates or ZSM-5 seeding crystals.

BACKGROUND OF THE INVENTION

Zeolites are crystalline aluminosilicates which have a uniform crystal structure characterized by a large number of regular small cavities interconnected by a large number of even smaller rectangular channels. It was discovered that, by virtue of this structure consisting of a network of interconnected uniformly sized cavities and channels, crystalline zeolites are able to accept for absorption molecules having sizes below a certain well defined value whilst rejecting molecules of larger size, and for this reason they have come to be known as "molecular sieves." This characteristic structure also gives them catalytic properties, especially for certain types of hydrocarbon conversions.

The ZSM family of zeolites is well known and their preparation and properties have been extensively described. Thus, for example, one type of the ZSM family or zeolites is that known as ZSM-5. The crystalline aluminosilicate zeolite known as ZSM-5 is particularly described in U.S. Pat. No. 3,702,886; the disclosure of which is incorporated herein by reference. ZSM-5 crystalline aluminosilicate is characterized by a silica-to-alumina mole ratio of greater than 5 and more precisely in the anhydrous state by the general formula:

$$[0.9\pm0.2M_{2/n}O:Al_2O_3:>5SiO_2]$$

wherein M having a valence n is selected from the group consisting of a mixture of alkali metal cations and organo ammonium cations, particularly a mixture of sodium and tetraalkyl ammonium cations, the alkyl groups of which preferably contain 2 to 5 carbon atoms. The term "anhydrous" as used in the above context means that molecular water is not included in the formula. In general, the mole ratio of $SiO_2$ to $Al_2O_3$ for a ZSM-5 zeolite can vary widely. For example, ZSM-5 zeolites can be aluminum-free in which the ZSM-5 is formed from an alkali mixture of silica containing only impurities of aluminum. All zeolites characterized as ZSM-5, however, will have the characteristic X-ray diffraction pattern set forth in U.S. Pat. No. 3,702,886 regardless of the aluminum content of the zeolite.

Based on the unique pore structure of ZSM-5, this zeolite can be applied extensively as a catalyst material to various processes. Zeolite ZSM-5 has been shown to be a particularly useful catalyst in reactions involving aromatic compounds, with emphasis on those having a single carbocycle. Thus ZSM-5 exhibits unique selectivity in the conversion of olefins, naphthenes, alcohols, ethers and alkanes into aromatic compounds and in such reactions as isomerization, alkylation, dealkylation and transalkylation of aromatics. That favorable influence on aromatic conversion reactions is found also in the forms of ZSM-5 in which another metal appears in isomorphic substitution for aluminum, as described in U.S. Pat. No. 4,163,028. ZSM-5 has also been extensively applied in catalytic cracking and catalytic dewaxing. When ZSM-5 is used in catalytic cracking of petroleum, enhancement of gasoline octane is achieved. Accordingly, ZSM-5 has been used as an additive to other cracking catalysts, e.g. zeolite Y, to improve gasoline octane and LPG yields.

The use of ZSM-5 type zeolite in conjunction with a zeolite cracking catalyst of the X or Y faujasite variety is described in U.S. Pat. Nos. 3,894,931; 3,894,933; and 3,894,934. The two former patents disclose the use of ZSM-5 type zeolite in amounts up to and about 5 to 10 weight percent; the latter patent discloses the weight ratio of ZSM-5 type zeolite to large pore size crystalline zeolite within the range of 1:10 to 3:1.

The addition of a separate additive catalyst comprising one or more members of the ZSM-5 type has been found to be extremely efficient as an octane and LPG yield improver when used in very small amounts in conjunction with a conventional cracking catalyst. Thus, in U.S. Pat. No. 4,309,179, it was found that only 0.1 to 0.5 weight percent of a ZSM-5 type catalyst added to a conventional cracking catalyst under conventional cracking operations could increase octane by about 1 to 3 RON+0 (research octane number without lead).

Generally, the octane gain of a ZSM-5 containing cracking catalyst is associated with gasoline ($C_5^+$) yield decrease and correspondingly higher yields of $C_3$ and $C_4$ gaseous products. As the freshly added ZSM-5 undergoes hydrothermal deactivation, the octane enhancement is reduced and additional ZSM-5 must be added to maintain the desired octane level.

Crystalline aluminosilicates in general have been prepared from mixtures of oxides including sodium oxide, alumina, silica and water. More recently clays and coprecipitated aluminosilicate gels, in the dehydrated form, have been used as sources of alumina and silica in reaction systems. In some instances of synthetic faujasite synthesis from clay, the zeolitic product is in the form of an aggregate.

U.S. Pat. No. 4,091,007 teaches a method of preparing ZSM-5 from preformed extrudates without losing the shape of the extrudates upon crystallization. The extrudate contains a mixture of silica sources such as Ludox and sodium silicate, and kaolin calcined at 1800° F. In cases where it contains raw kaolin, the extrudate has been calcined in the temperature range between 1700° F. and 2000° F. Organic templates, such as tetramethylammonium chloride, tetrapropylammonium bromide, tri-n-propylamine, and n-propyl bromide, were used during crystallization in the examples. Extradates containing up to 60% of grown ZSM-5 were produced. A similar process is described in U.S. Pat. No. 5,558,851.

EP Publication No. 0,068,817 reveals a method of making ZSM-5 from acid-leached metakaolin. Metakaolin is treated with a strong acid, e.g., hydrochloric acid, sulphuric acid, and nitric acid, and orthophosphoric acid to extract at least part of the aluminum oxide content of the metakaolin and provide the material with a $SiO_2/Al_2O_3$ (mol) ratio in the range of from 10–200:1. In the presence of a quaternary compound such as tetrapropylammonium hydroxide, the acid-treated metakaolin reacts with NaOH to provide ZSM-5.

U.S. Pat. No. 6,004,527 teaches the synthesis of ZSM-5 from preformed silica-only microspheres. Aluminum and sodium sources were added via incipient wetness impregnation using the respective nitrate salts. Tetrapropylammonium hydroxide was used as a directing agent. ZSM-5 crystallinity of the product was 25% and the particle shape and size of the silica microsphere were retained in the product.

U.S. Pat. No. 4,522,705 relates to a method of making ZSM-5 additive catalyst prepared by in-situ crystallization of a clay aggregate. Clay microspheres were treated with an aqueous solution of sodium hydroxide and organic template such as n-propylamine. In a variation, the preformed microspheres were formed containing crystalline ZSM-5 as seeds. Crystallization was carried out in the presence of NaOH and n-propylamine.

Seeding as a means for inducing crystallization is a very old technique. In the art of zeolite manufacture, various patents describe the use of seeding to induce the rapid crystallization of zeolites. Various patents describing the manufacture of zeolite crystals by seeding with a zeolite include: United Kingdom Pat. No. 1,297,256, in making ZSM-4; U.S. Pat. No. 3,247,194, in making ZK-5; U.S. Pat. No. 3,733,391, in making faujasite; and U.S. Pat. No. 4,007,253, in making faujasite in which the seed is not the same as the product. Patents disclosing the formation of zeolites by seeding with other aluminosilicates include: United Kingdom Patent No. 1,117,568, in making ZSM-4; United Kingdom Patent No. 1,160,463, in making faujasite; U.S. Pat. No. 3,578,398, in making a zeolite similar to offretite; and U.S. Pat. No. 3,947,482, in making various zeolites. It is to be understood that the mentioned preceding patents are not an exhaustive list of all patents which discuss forming zeolite crystals by seeding.

EP Publication No. 0,156,595 teaches in-situ ZSM-5 synthesis from extrudates and microspheres in the absence of any organic compounds of nitrogen and phosphorus. 5% ZSM-5 is included as seeds in the preformed particles. The seeds employed are said to be the same as the zeolite intended to grow. In examples where there is no ZSM-5 seed presence, no ZSM-5 is crystallized.

U.S. Pat. No. 5,145,659 discloses the synthesis of ZSM-5 from a preformed matrix such as clay extrudates or spray dried microspheres containing a source of silica, alumina, alkali metal, or mixtures thereof. The preformed matrix is enriched in silica by precipitation of silicate from a solution of a silicate source and addition of a zeolite synthesis reaction mixture which contains an organic templating agent and/or ZSM-5 seeds. No ZSM-5 is crystallized in examples where there are no ZSM-5 seeding crystals or organic template present.

U.S. Pat. No. 6,261,534 discloses a zeolite crystallization method that comprises combining a template-free reaction mixture containing a source of silicon oxide and aluminum oxide and sufficient water to shape the mixture into particles. Zeolites such as ZSM-5 are crystallized within the shaped particles while heating the reaction mixture in the absence of an external liquid phase. While there is disclosure that ZSM-5 can be crystallized without the addition of seeds, ZSM-5 crystals are used in the only examples disclosed.

U.S. Pat. No. 5,232,675 discloses the synthesis of a rare earth-containing high-silica zeolite having pentasil-type structure. The reaction mixture is free of organic compounds of nitrogen and phosphorus. Water glass, aluminum phosphate, and inorganic acid are used as raw materials, and REY or REX zeolite are used as seeds. Reaction data suggests that upon steam deactivation, the rare-earth containing ZSM-5 have good activity maintenance as compared to ZSM-5 without rare earth.

Chinese patent publications CN 1,194,943A and CN 1,057,067C disclose a process for synthesizing molecular sieve ZSM-5 with use of NaY mother liquid as raw material and includes the acid deposition of silica and alumina, spray drying to obtain microspheres, mixing the microspheres with NaOH, water and optionally crystal seed of molecular sieve, and hydrothermal crystallizing.

Since the 1960's, most commercial fluid catalytic cracking catalysts have contained zeolites as an active component. Such catalysts have taken the form of small particles, called microspheres, containing both an active zeolite component and a non-zeolite component in the form of a high alumina, silica-alumina matrix.

In prior art fluid catalytic cracking catalysts, the active zeolitic component is incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

For many years a significant proportion of commercial FCC catalysts used throughout the world have been made by in-situ synthesis from precursor microspheres containing kaolin that had been calcined at different severities prior to formation into microspheres by spray drying.

For example, commonly assigned U.S. Pat. No. 4,493,902, the teachings of which are incorporated herein by cross-reference, discloses novel fluid cracking catalysts comprising attrition-resistant, high zeolitic content, catalytically active microspheres containing more than about 40%, preferably 50–70% by weight Y faujasite and methods for making such catalysts by crystallizing more than about 40% sodium Y zeolite in porous microspheres composed of a mixture of metakaolin (kaolin calcined to undergo a strong endothermic reaction associated with dehydroxylation) and kaolin calcined under conditions more severe than those used to convert kaolin to metakaolin, i.e., kaolin calcined to undergo the characteristic kaolin exothermic reaction, sometimes referred to as the spinel form of calcined kaolin. In a preferred embodiment, the microspheres containing the two forms of calcined kaolin are immersed in an alkaline sodium silicate solution, which is heated, preferably until the maximum obtainable amount of Y faujasite is crystallized in the microspheres.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

While the prior art as discussed above has attempted to form in-situ ZSM-5 from clay aggregates, including aggregates formed from kaolin, the zeolite-forming process has included the addition of organic templates typically used in ZSM-5 synthesis and/or required use of ZSM-5 seed crystals. The need to use either of these materials greatly undercuts the economic advantage of using kaolin aggregates as a raw material in zeolite synthesis by the in-situ method.

SUMMARY OF THE INVENTION

In accordance with the present invention, synthesis of in-situ ZSM-5 microspheres is achieved using kaolin microspheres with a zeolite Y seed solution in a reaction system otherwise free of organic templating materials and ZSM-5 seeding crystals. In-situ ZSM-5 synthesis from kaolin microspheres is achieved by minimizing the amount of the reactive alumina in the kaolin microsphere by calcination at elevated temperatures. Mixing the calcined kaolin microspheres with a silica source and a seed solution used for in-situ FCC Y synthesis and heating results in growth of ZSM-5 crystals on the microsphere. The in-situ ZSM-5 has use as an FCC additive and catalyst for fine chemical processes such as organic compound manufacture.

DETAILED DESCRIPTION OF THE INVENTION

Figure 1:
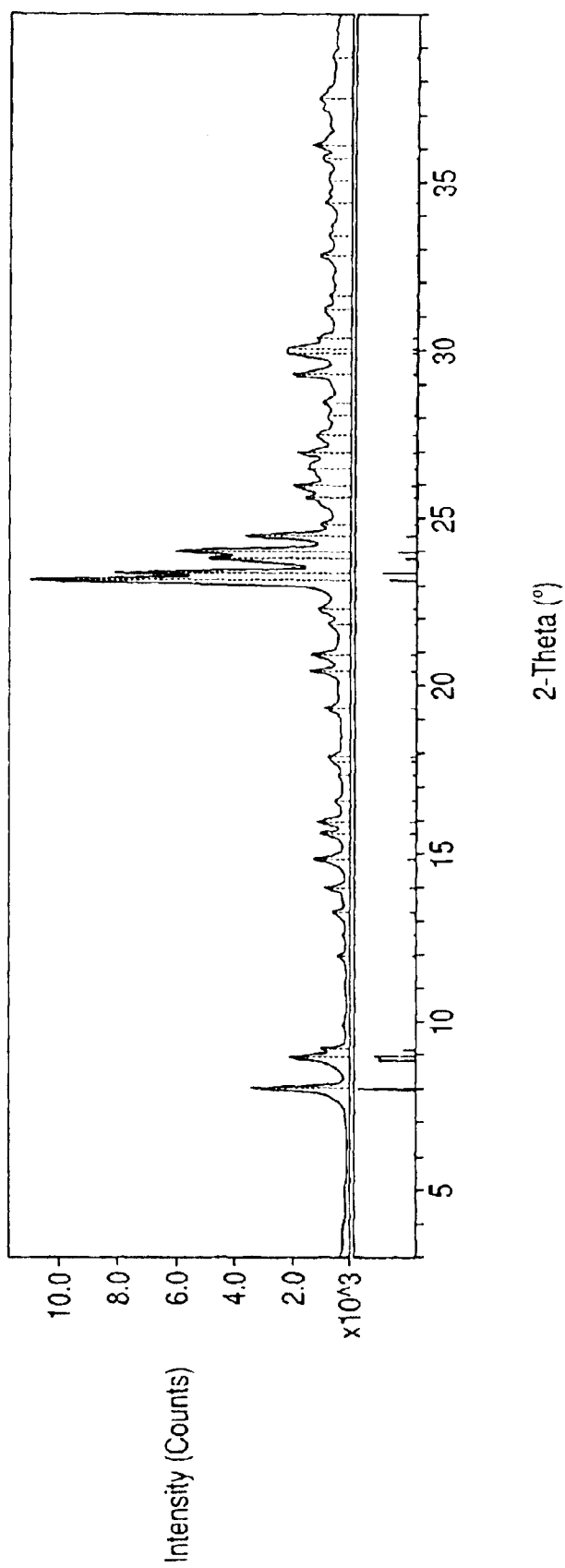
FIG. 1 is an XRD pattern of an as crystallized ZSM-5-containing microsphere formed by the process of this invention.

Preparation of the fluid cracking additive catalyst, in accordance with this invention, involves an initial step of preparing microspheres comprising hydrous kaolin, metakaolin, kaolin calcined undergone through characteristic exothermic reaction, or mixtures of the kaolin forms. Optionally, colloidal silica, silica sol or sodium silicate binder can be added. The microspheres are calcined to convert any hydrous kaolin and metakaolin that may be present to spinel and/or mullite. In case where hydrous kaolin and metakaolin are not present, high calcination temperature may not be required. It is important that the microspheres prior to crystallization contain only a minimum of reactive alumina. Accordingly, the calcined microspheres will have a metakaolin content that is less than 10 wt. %. Preferably the metakaolin content in the calcined microspheres is less than 5 wt. %. Spinel and mullite contain little reactive alumina, which is determined by the amount of alumina solublized in a 1/1 hydrochloric acid/water solution following a thirty-minute digestion at 115° C.

The initial microspheres are made by spray drying a feed mixture containing hydrated kaolin, metakaolin, or kaolin calcined through the characteristic exothermic reaction and optionally colloidal silica and/or silica sol and/or sodium silicate binder. Mixtures of the kaolin forms can also be used. Enhancing the silica level in the preformed microsphere by including silica-rich components or using more silicate binder increases the overall reactive $SiO_2/Al_2O_3$ ratio, resulting in an increased level of crystallized ZSM-5. If a silicate binder is used such as sodium silicate, and if desired, sodium in the microspheres can be washed out at low pH, e.g., pH of 3. The spray dried microspheres are washed and then calcined to form precursor porous microspheres in which any of the hydrous kaolin and metakaolin is converted to spinel or mullite. The amount of metakaolin present in the calcined precursor microspheres needs to be minimized, i.e. less than 10%, to provide the desired reactive $SiO_2/Al_2O_3$ ratio and allow formation of ZSM-5 crystals. Typically, the calcined precursor microspheres will have a BET surface area of less than 200 m²/g.

In an alternative method of forming a microsphere with a reduced reactive alumina content, the process of acid leaching a metakaolin as described in EP 068,817 can be used. According to the process as described therein, a method of manufacturing a crystalline zeolite of the ZSM family comprises the initial step of treating an aluminosilicate such as metakaolin with a strong acid at a temperature and for a time sufficient to extract at least part of the aluminum oxide content of the aluminosilicate and increase the molar ratio of $SiO_2:Al_2O_3$ in the aluminosilicate to a value not less than 10:1. The acid used preferably has a $pK_a$ value not greater than 2 and most preferably has a $pK_a$ value of less than 0. Suitable acids include hydrochloric acid, sulphuric acid, nitric acid, and orthophosphoric acid. The acid should be used at a concentration of at least 2M, preferably at least 5M, and most preferably at least 7M. The optimum acid concentration depends upon the weight ratio of acid solution to dry aluminosilicate and upon the type of acid used and thus the nature of the aluminum salt formed and its solubility in the acid solution. The weight ratio of acid solution to dry aluminosilicate is preferably at least 5:1. The acid treatment is preferably performed at a temperature in the range of from 50° C. to 120° C. for at least 1 hour, and under conditions such that the molar ratio of $SiO_2:Al_2O_3$ in the acid-treated aluminosilicate is in the range 10–200:1. Usually, after the acid treatment the molar ratio of $SiO_2:Al_2O_3$ in the aluminosilicate is in the range 10–50:1.

The precursor microspheres, having a minimum of reactive alumina achieved either by high temperature calcination of kaolin or acid leaching of metakaolin, are reacted with zeolite Y seed solution and an alkaline sodium silicate solution. The zeolite Y seed solution is one intended for use in initiating crystallization of synthetic crystalline zeolite of the Y-type. ZSM-5 seeds are not used in the reaction.

Preparation of zeolite Y seed solution While it is useful to use crystallized zeolite Y seeds in this invention, the zeolite Y seed solution is most usefully obtained by processes disclosed in U.S. Pat. No. 4,493,902 and U.S. Pat. No. 4,631,262, the entire contents of which are herein incorporated by reference. As disclosed in U.S. Pat. No. 4,631,262, appropriate quantities of sodium silicate, sodium aluminate and sodium hydroxide are mixed, preferably in a controlled manner, hereinafter described, heating the resulting mixture for a time sufficient for the seeds to mature but insufficient for cloudiness to occur, and thereafter adding to the matured solution a portion of the sodium silicate reactant that would normally be included in the reaction slurry including the porous microspheres of calcined kaolin. The sodium silicate added to the matured seed solution is preferably at ambient temperature when it is added to the solution. The amount of sodium silicate solution added to the solution of matured clear seeds is effective to result in a seed solution which will maintain its clarity when aged for 48 hours or longer (without cooling). In effect, enrichment of a clear solution of matured seeds with sodium silicate functions to quench the undesirable reaction(s) that may take place and which would result in undesired cloudiness. The seed solution is amorphous and does not exhibit any detectable crystallinity by x-ray diffraction.

A solution of matured seeds which has become clouded or gelled can be made clear by adding additional sodium silicate solution, the amount of sodium silicate solution being effective to assure that the previously clouded or gelled solution will maintain its clarity when aged for 48 hours or longer without cooling. In this case, the sodium silicate enriched seed mixture is optionally, but preferably, heated and then permitted to age at ambient temperature. Heating after addition of sodium silicate is preferred because clarification will take place in a shorter time.

As used herein, the terms "solution of zeolite seed" and "zeolite initiator" shall include any aqueous solution containing silica, alumina and soda that either allows a zeolite Y crystallization process that would not occur in the absence of the seed material or shortens significantly the zeolite Y crystallization process that would occur in the absence of the seed material. Again, the zeolite Y seed solution as described above does not contain crystalline zeolite Y.

Recommended seed solutions have the following composition on a molar basis prior to adding sodium silicate diluent as shown in Table 1.

TABLE 1

Composition of Seed Solutions

| | PREFERRED | ESPECIALLY PREFERRED |
|---|---|---|
| $H_2O/Na_2O$ | 15–18 | 17.94 |
| $Na_2O/SiO_2$ | 0.9–1.1 | 1.00 |
| $SiO_2/Al_2O_3$ | 15.5–19 | 17.55 |

The preferred materials used to prepare the seed solution are sodium silicate of approximate 2/1 $SiO_2/Na_2O$ molar ratio, preferably a concentrated (44%) by-product of catalyst manufacture analyzing about 14.8 wt % $Na_2O$, 28.6% $SiO_2$, the balance being water (See U.S. Pat. No. 4,493,902); a 25% (wt) solution of NaOH and Nalco 2372 sodium aluminate solution (typically analyzing 18.3% $Na_2O$, 19.9% $Al_2O_3$). The composition of the seed solution on a weight basis is as shown in Table 2.

TABLE 2

Composition of Seed Solution - Basis 100# seeds

| | Total | $Al_2O_3$ | $SiO_2$ | $Na_2O$ | $H_2O$ |
|---|---|---|---|---|---|
| Sodium Silicate (44%) | 46.64 | 0 | 13.34 | 6.90 | 26.40 |
| NaOH (25%) | 29.21 | 0 | 0 | 5.66 | 23.55 |
| Sodium Aluminate | 6.48 | 1.29 | 0 | 1.19 | 4.00 |
| Water | 17.67 | 0 | 0 | 0 | 17.67 |
| Total | 100.00 | 1.29 | 13.34 | 13.75 | 71.62 |

The ingredients used to form the solution of seeds may be heated at temperatures in the range of about 70° F. to 120° F., preferably about 100° F., during the mixing step and may be maintained at temperatures in the range of about 80° F. to 120° F., preferably about 100° F., to mature the seeds. At temperatures appreciably below 100° F., the time required for the seeds to mature may be too long for effective commercial practice. At temperatures appreciably above 100° F., zeolite growth may be impaired.

The composition of the seed solution after quenching by addition of sodium silicate will depend on the amount of silicate added and the chemical composition of the sodium silicate solution.

Compositions of seed solutions after dilution with sodium silicate appear below in Table 3.

TABLE 3

Composition of Sodium Silicate Diluted Seeds

| | Preferred | Especially Preferred |
|---|---|---|
| $H_2O/Na_2O$ | 13–17 | 16.68 |
| $SiO_2/Al_2O_3$ | 23–206 | 30.47 |
| $Na_2O/SiO_2$ | 0.54–.87 | 0.823 |

As disclosed in U.S. Pat. No. 4,493,902, zeolite initiator may be provided from a number of sources. For example, the zeolite initiator may comprise recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" shall mean a zeolite initiator that exhibits no detectable crystallinity by x-ray diffraction.

The amorphous zeolite initiator may be prepared by mixing solutions of sodium silicate and sodium aluminate and aging the mixture for a time and at a temperature sufficient to form the amorphous zeolite initiator. Good amorphous zeolite initiators for internal seeding have been made by aging a mixture having the molar ratios indicated below for 24 or more hours at 100° F.

| $Na_2O/SiO2$ | $SiO_2/Al_2O_3$ | $H_2O/Na_2O$ |
|---|---|---|
| 1.005 | 17.60 | 17.66 |

Best results have been obtained when a sodium silicate solution was added rapidly to a sodium aluminate solution, with rapid mixing, or when the two solutions were simultaneously added to a mixer, with rapid mixing.

When the sodium silicate and sodium aluminate solutions are mixed, the resulting mixture is clear. However, after the mixture has been aged at 100° F. for about 24 hours or longer, it begins to acquire a cloudy appearance. It is preferred that the mixture comprising zeolite initiator used for internal seeding have such a cloudy appearance because the use of a clear mixture comprising zeolite initiator can result in slower zeolite growth during the crystallization. In contrast, it is preferred that the mixture containing amorphous zeolite initiator used for external seeding be clear.

The level of silicate added to the mixture of calcined microspheres and any zeolite seed solution or zeolite initiator should be such as to provide in the reactor a silica to reactive alumina molar ratio or $SiO_2/Al_2O_3$ ratio of at least 20, preferably at least 30. Reactive alumina is determined as described above. The pH of the reaction solution should be less than 14 and at least have a pH of 10.5. The pH of the solution can be adjusted by the addition of an acid. Suitable acids include hydrochloric acid, sulphuric acid, nitric acid, and orthophosphoric acid. Reaction generally takes place in an autoclave under agitation at a temperature of from 130–240° C., preferably 150–200° C., for 5–30 hours, preferably from 10–25 hours.

After the crystallization reaction, the product is filtered from the mother liquor and washed with water. The microspheres typically contain at least 20 wt % zeolite ZSM-5 crystallized therein. Zeolite ZSM-5 content of from 20 to about 65 percent by weight can be achieved with this invention.

The following examples illustrate the invention and are not intended to limit the scope of the invention solely to the embodiments set forth therein.

EXAMPLE 1

Table 4 gives the formulation of a clear zeolite Y seed solution used in the present invention.

TABLE 4

Seed Solution

| Seeds | $Na_2O$, wt % | $SiO_2$, wt % | $Al_2O_3$, wt % |
|---|---|---|---|
| | 13.8 | 23.0 | 0.6 |

EXAMPLE 2

In the following example, microspheres designated "MS-1" were formed by spray drying an aqueous slurry of hydrous kaolin which was then calcined at a temperature of above 1800° F. The microspheres had an average particle size of 70 microns. The following components were mixed:

| | |
|---|---|
| MS-1 | 700 g |
| N-brand ® silicate | 1880 g |
| Water | 9063 g |
| Seed Solution of Example 1 | 497 g |
| 21 Wt. % H$_3$PO$_4$ | 420 g |

The mixture had a solids content of 6.1% and a pH of 11.5.

The reaction proceeded at about 170° C. under agitation in an autoclave for 15 hours. After reaction, the microspheres were filtered from the mother liquor and then washed with water. The microspheres were found to contain 20% crystallized ZSM-5. Table 5 sets forth the properties of the "as crystallized" material.

TABLE 5

Properties of as crystallized in-situ ZSM-5 microspheres

| | |
|---|---|
| Na$_2$O | 2.69% |
| SiO$_2$ | 57.43% |
| Al$_2$O$_3$ | 36.55% |
| ABD | 0.86 |
| TSA m$^2$/g | 68.4 |
| MSA m$^2$/g | 18.7 |
| ZSA m$^2$/g | 49.3 |

FIG. 1 is an XRD pattern taken of the as crystallized microsphere. As can be seen, the peaks correspond with the ZSM-5 lines shown at the bottom of the chart.

EXAMPLE 3

The following components were reacted under agitation in an autoclave as in Example 2.

| | |
|---|---|
| MS-1[1] | 25.0 g |
| Seed Solution of Example 1 | 17.74 g |
| N-brand ® | 67.12 g |
| Water | 323.68 g |
| 21 Wt. % H$_3$PO$_4$ | 15 g |

[1]The amount of reactive alumina in MS-1 is 0.48 wt %.

The pH of the resulting slurry was 11.3. Subsequent to reaction and filtering of the crystallized microspheres from the mother liquor, it was found that the microspheres contained approximately 25 percent ZSM-5.

EXAMPLE 4

The microspheres of this example were made in a pilot plant with nozzle-type atomizer. The following components as set forth in Table 6 were mixed in a Cowles mixer and spray dried. The sodium silicate was added directly to calcined kaolin slurry, resulting in flocculation. Solids were adjusted appropriately in order to enable spray drying.

TABLE 6

| | |
|---|---|
| M93[1] | 100% |
| Silicate binder (as SiO$_2$)[2] | 55% |

[1]An ultrafine hydrous kaolin pulverized and calcined through the exotherm to small crystallite size mullite.
[2]3.22 SiO$_2$/Na$_2$O The microspheres were acid washed with nitric acid at a slurry pH of about 3 to lower the sodium level of the microspheres to less than 1 wt %. The microspheres were then dried and calcined at 750° F. for 2 hours before further use.

EXAMPLE 5

The following components were reacted under agitation in an autoclave as in Example 3.

| | |
|---|---|
| Acid Washed Microspheres of Example 4 | 40.0 g |
| Seed Solution of Example 1 | 23.7 g |
| Water | 180.0 g |

Subsequent to reaction at 180° C. for 20 hours and filtration of the crystallized microspheres from the mother liquor, it was found that the microspheres contained approximately 40 percent ZSM-5.

EXAMPLE 6

The microspheres of this example were made in a pilot plant with nozzle-type atomizer. The following components as set forth in Table 7 were mixed in a Cowles mixer and spray dried. The sodium silicate was added directly to the mixed slurry of calcined kaolin and Ludox AS-40 colloidal silica, resulting in flocculation. Solids were adjusted appropriately in order to enable spray drying.

TABLE 7

| | |
|---|---|
| M93 | 50% |
| Ludox AS-40 | 50% |
| Silicate binder (as SiO$_2$)[1] | 25% |

[1]3.22 SiO$_2$/Na$_2$O

The microspheres were acid washed with nitric acid at a slurry pH of about 3 to lower the sodium level to less than 1 wt %. The acid washed microspheres were then dried and calcined at 750° F. for 2 hours before further use.

EXAMPLE 7

The following components were reacted under agitation in an autoclave as in Example 3.

| | |
|---|---|
| Acid Washed Microspheres of Example 6 | 40.0 g |
| Seed Solution of Example 1 | 23.7 g |
| Water | 180.0 g |

Subsequent to reaction at 180° C. for 24 hours and filtering of the crystallized microspheres from the mother liquor, it was found that the microspheres contained approximately 50 percent ZSM-5.

EXAMPLE 8

The crystallized microspheres from Example 3 were ammonium exchanged to reduce the sodium level to less than 0.5 wt % and calcined at 1200° F. for 2 hours. The resulting microspheres were added in the amount specified in Table 8 to a steam-deactivated FCC Y zeolite catalyst and compared with a standard FCC Y zeolite and FCC Y zeolite containing 15% incorporated ZSM-5 additive (fresh) in an experimental fixed fluid bed unit. The results are shown in Table 8. The baseline catalyst comprised 90 wt. % FCC Y and 10% inert particles. The inventive samples contained 90 wt. % FCC zeolite Y, the stated amount of in-situ ZSM-5, and the balance inert particles.

TABLE 8

| Percent Additive | Baseline | [1]2.50% Example 3 | | [2]10.00% Example 3 | | [2]10.00% incorporated additive[3] |
|---|---|---|---|---|---|---|
| Conversion | 74.49 | 75.147 | 75.358 | 76.502 | 76.439 | 75.54 |
| Activity[4] | 2.92 | 3.024 | 3.058 | 3.256 | 3.244 | 3.09 |
| Product Yield, wt % | | | | | | |
| Hydrogen | 0.07 | 0.071 | 0.074 | 0.096 | 0.101 | 0.06 |
| Methane | 0.57 | 0.563 | 0.576 | 0.692 | 0.707 | 0.62 |
| Ethylene | 0.62 | 2.125 | 2.048 | 3.173 | 3.067 | 0.88 |
| Ethane | 0.49 | 0.595 | 0.593 | 0.953 | 0.953 | 0.53 |
| Propane | 1.30 | 2.779 | 2.651 | 6.034 | 5.934 | 1.86 |
| Propylene | 4.68 | 7.991 | 7.829 | 7.491 | 7.552 | 6.83 |
| nButane | 1.11 | 1.3 | 1.278 | 1.989 | 1.996 | 1.19 |
| iButane | 4.94 | 5.935 | 6.092 | 7.115 | 7.076 | 6.35 |
| 1 Butene | 1.22 | 1.206 | 1.2 | 0.969 | 0.969 | 1.23 |
| t2Butene | 1.67 | 1.725 | 1.731 | 1.518 | 1.566 | 1.88 |
| c2Butene | 1.27 | 1.307 | 1.311 | 1.128 | 1.16 | 1.4 |
| iButylene | 1.30 | 1.807 | 1.753 | 1.963 | 1.97 | 1.68 |
| Gasoline | 52.26 | 44.801 | 45.253 | 40.047 | 39.985 | 47.54 |
| LCO | 16.27 | 14.935 | 15.802 | 14.939 | 15.165 | 15.74 |
| Bottoms | 9.24 | 9.917 | 8.84 | 8.559 | 8.397 | 8.71 |
| Coke | 2.99 | 2.94 | 2.97 | 3.354 | 3.403 | 3.5 |

[1]2.5% Example 3, 90% FCC catalyst, balance 7.5% inert microsphere.
[2]10% ZSM-5 additive and 90% FCC catalyst.
[3]Incorporated additive contains 15% ZSM-5
[4]Activity is defined as x/(1 − x), where x is the gas oil conversion.

As can be seen from Table 8, the additive catalyst of the present invention was substantially more active than the baseline catalyst and even more active than the incorporated ZSM-5 catalyst even though the inventive catalyst was provided in amounts of about ¼ of that of the incorporated additive. The addition of ZSM-5 additive to the baseline is expected to increase activity for gasoline cracking as is characterized by the reduced gasoline yield of both compositions containing the additive ZSM-5 catalysts. What is surprising is that the in-situ additive at a 2.5% level (0.625% ZSM-5) is more active than the incorporated ZSM-5 additive at a 10% level (1.5% ZSM-5) (gasoline 44.8 versus 47.54). Importantly, the propylene yield of the in-situ additive was increased relative to the ZSM-5 incorporated additive, again even though the in-situ additive was present in smaller amounts (propylene 7.9 versus 6.8).

What is claimed is:

1. A process for making ZSM-5 comprising forming an aqueous reaction mixture containing calcined kaolin microspheres, a solution of seeds characterized as promoting growth of zeolite Y crystals, and silicate, said reaction mixture having a mole ratio of silica to reactive alumina of at least 20 and a pH of less than 14, reacting said mixture at elevated temperature and for a time to form in-situ ZSM-5 crystals on said microspheres, said aqueous reaction mixture being free of organic templates and free of ZSM-5 seed-crystals.

2. The process of claim 1 wherein the mole ratio of silica to reactive alumina in said reaction mixture is at least 30.

3. The process of claim 1 wherein said calcined kaolin microspheres are agitated during said reacting.

4. The process of claim 1 wherein the pH of said reaction mixture is at a range of 10.5 to less than 14.

5. The process of claim 1 wherein said elevated temperature is 130–240° C. and said time for reaction is from about 5–30 hours.

6. The process of claim 5 wherein said elevated temperature is 150–200° C. and said time of reaction is from about 10–25 hours.

7. The process of claim 1 wherein said reaction mixture includes an acid to provide said pH.

8. The process of claim 1 wherein said calcined kaolin microspheres are formed from hydrous kaolin, metakaolin, kaolin calcined at a temperature of greater than 1400° F., or mixtures thereof.

9. The process of claim 8 wherein said calcined kaolin microspheres are formed with a silica or silicate binder.

10. The process of claim 9 wherein said calcined kaolin microspheres comprise spinel, mullite, or mixture thereof.

11. The process of claim 9 wherein said calcined kaolin microspheres contain less than 10 wt. % metakaolin.

12. The process of claim 9 wherein said calcined kaolin microspheres contain less than 5 wt. % metakaolin.

13. The process of claim 1 wherein said calcined kaolin microspheres comprise silica-rich components and/or metakaolin which has been leached with an acid to extract at least a portion of the aluminum oxide content of said metakaolin.

14. The process of claim 1 wherein said calcined kaolin microspheres have an average particle size of from about 20 to about 150 microns.

15. The process of claim 1 wherein said calcined kaolin microspheres have an average particle size of from about 40 to about 100 microns.

16. The process of claim 1 wherein said solution of seeds does not exhibit detectable crystallinity by x-ray diffraction.

17. The process of claim 1 wherein said solution of seed includes zeolite Y crystals.

18. The process of claim 1 wherein said calcined kaolin microspheres have a BET surface area of less than 200 g/m².

19. The process of claim 16 where said calcined kaolin microspheres contain less than 5 wt % metakaolin.

20. In a process for catalytic cracking of a petroleum faction under cracking conditions in the presence of a conventional cracking catalyst and an additive catalyst comprising ZSM-5, the improvement wherein said additive catalyst is formed by the process of claim 1.

21. The process of claim 20 wherein said conventional cracking catalyst is zeolite Y.

22. The process of claim 20 wherein said catalytic cracking is fluidized catalytic cracking.

23. The process of claim 20 wherein said additive catalyst is present in amounts of 1 to 50 wt. % relative to the total amount of catalyst.

24. The process of claim 23 wherein said additive catalyst is present in amounts of 1 to less than 10 wt. % relative to the total amount of catalyst.

* * * * *